(12) United States Patent
Yang

(10) Patent No.: US 7,294,426 B2
(45) Date of Patent: Nov. 13, 2007

(54) SEALING STRUCTURE FOR SEALING SEPARATOR PLATES OF FUEL CELL MODULES

(75) Inventor: Jefferson Y S Yang, Orange, CA (US)

(73) Assignee: Asia Pacific Fuel Cell Technologies, Ltd., Miaoli (TW)

( * ) Notice: Subject to any disclaimer, the term of this patent is extended or adjusted under 35 U.S.C. 154(b) by 531 days.

(21) Appl. No.: 10/890,195

(22) Filed: Jul. 14, 2004

(65) Prior Publication Data

US 2005/0130016 A1 Jun. 16, 2005

(30) Foreign Application Priority Data

Dec. 12, 2003 (TW) .............................. 92135318 A

(51) Int. Cl.
*H01M 2/08* (2006.01)
(52) U.S. Cl. ....................................................... 429/35
(58) Field of Classification Search .................. 429/35, 429/30, 44
See application file for complete search history.

(56) References Cited

U.S. PATENT DOCUMENTS

| 6,699,613 B2 * | 3/2004 | Inoue et al. .................. 429/35 |
| 6,852,439 B2 | 2/2005 | Frank et al. |
| 6,893,767 B2 | 5/2005 | Hatano et al. |

* cited by examiner

*Primary Examiner*—Patrick Joseph Ryan
*Assistant Examiner*—Thomas H. Parsons
(74) *Attorney, Agent, or Firm*—Rosenberg, Klein & Lee

(57) ABSTRACT

A fuel cell is provided that includes anode and cathode plates each formed with a peripheral groove and an extended groove at a circumferential portion thereof. Silicone, rubber is applied to the peripheral groove and the extended groove. Before the silicone rubber has cured, the anode plate, a membrane electrode assembly and the cathode plate are stacked and compressed to form a tight seal at the circumferential portions between the anode plate and the cathode plate. The membrane electrode assembly is tightly sandwiched between the silicone rubber at the extended groove of the anode plate and the silicone rubber at the extended groove of the cathode plate to form a tight seal around the ports between the anode plate and cathode plate.

9 Claims, 12 Drawing Sheets

SEALING STRUCTURE FOR SEALING SEPARATOR PLATES OF FUEL CELL MODULES

BACKGROUND OF THE INVENTION

1. Field of the Invention

The present invention relates to a proton exchange membrane fuel cell, particularly to a sealing structure for sealing single fuel cell and stacked fuel cell module.

2. Description of the Prior Art

In the field of fuel cell technology, fuel cell is classified based on the electrolyte thereof. There are approximately five kinds of fuel cells which have been developed, namely, proton exchange membrane fuel cell or polymer electrolyte membrane fuel cell, abbreviated as PEMFC, alkaline fuel cell (AFC), phosphoric acid fuel cell (PAFC), molten carbonate fuel cell (MCFC) and solid oxide fuel cell (SOFC). Each kind of fuel cell has its own advantages, disadvantages and extent of applications. Among these known fuel cells, the PEMFC would be the most competitive power supply and has high practical value.

Principally, a fuel cell is combines hydrogen and oxygen in an electrochemical reactions to produce water and release electrical energy, which can be basically considered a device that is the reverse of water electrolysis.

The performance of fuel cell mainly depends on the extent of the electrochemical reaction, which is affected by the materials forming the layers of the fuel cell and the sealing between the plates. Hence, the selections of the materials and prevention of leakage between the layers will be the important factors of the performance of the fuel cell operations.

However, although much effort has been put to settle the aforesaid problems, the result is not satisfied. Generally speaking, there are two reasons adversely affecting the precise control: one is a failure to efficiently perform the leak and pollution proof functions between the anode and cathode bipolar plates, and the other is a failure to properly control the conductive compression pressure between each layer under an optimal status.

Please refer to FIG. 1 which shows a cross-sectional view of the single cell of a prior art PEMFC. As shown, the single cell is constituted by an anode plate 101 and a cathode plate 102. Basically, an anode gas diffusion layer 104 and a cathode gas diffusion layer 105 are separately provided on the two sides of a proton exchange membrane (PEM) 103, forming a membrane electrode assembly (MEA). The MEA is mounted between the anode plate 101 and the cathode plate 102.

The inner surface of the anode plate 101 facing the MEA is formed with a plurality of anode gas channels 101a, and the inner surface of the cathode plate 102 facing the MEA is formed with a plurality of cathode gas channels 102a. The anode plate 101 and cathode plate 102 are separately provided with gaskets 106, 107 along edge portions thereof. Then, the MEA is disposed on a central portion of the anode plate 101 and cathode plate 102, forming a gastight single cell.

Practically, a plurality of such single cells are stacked to configure a fuel cell stack as shown in FIG. 2. After the connections of plural manifolds or through holes adapted to supply gases and coolant and the dispositions of an upper end plate 108a and a lower end plate 108b, together with the conductive terminals 109a, 109b, the complete fuel cell stack 100 is able to perform the desired conductive reactions under a predetermined compression pressure by fastening a plurality of tie rods 110 therethrough.

However, this construction for the fuel cell will result in the following problems:

(1) The hydrogen supplied from the channels 101a of the anode plate 101 tends to leak out due to the gaps between the gasket 106 and the anode plate 101. Meanwhile, the oxygen or air supplied from the channels 102a of the cathode plate 102 also tends to leak out due to the gaps between the gasket 107 and the cathode plate 102. The leakage of hydrogen and oxygen significantly affects the electrochemical reactions of the fuel cell. This disadvantageous phenomenon will be extremely obvious after a considerable duration of using the gaskets 106, 107. Integral formation of those gaskets 106, 107 into a single gasket may improve the situation, but it cannot thoroughly solve the problem.

(2) Due to the property of the materials employed for the gaskets 106, 107 and the different aging rates of the gaskets, the compression pressure at the region of the gaskets is uneven, and hence the compression pressure in the whole fuel cell becomes uneven. This is why the reaction gases often fail to diffuse uniformly, which is a severe block to the conductivity of a PEMFC. Furthermore, because the whole PEMFC relies on the tie rods 110 disposed circumferentially to control its compression pressure, the pressure of the circumferential portion is significantly different from that of the central portion, which will adversely affect the operational effects of the fuel cell.

(3) Utilizing a gasket between the plates fails to efficiently isolate pollution and fails to properly locate each layer in position. Further, because it is difficult to control in advance the compression pressure at an optimal range, it is not possible to pre-prepare a stock of the single cells in the modulized form to proceed with any of the possible types of tests for the purposes of cost reduction and mass production. This is really the key factor of the failure to widely and effectively apply PEMFCs in the industry nowadays.

Accordingly, to provide a highly efficient, mass-producible and cost-saving modulized single cell and cell module to solve the above-mentioned problems and further supply breakthrough ideas in manufacturing the PEMFC is a common desire of people skilled in this field.

SUMMARY OF THE INVENTION

The primary objective of this invention is to provide a single cell of a fuel cell, particularly a single cell of a PEMFC or a module thereof assembled by the single cells, by means of modulizing and unitizing the cell and module, to simplify the manufacturing process of a PEMFC. Because it is possible to test the performance of each single cell or module in advance according to this invention, the quality of the whole fuel cell is significantly improved and the manufacturing cost thereof is reduced to a mass production scale, thereby practically replacing the existing energy.

Another objective of this invention is to provide a sealing structure for a fuel cell assembled by a plurality of modulized single cells or modules. By means of dispensing a desired amount of silicone rubber between the circumferential portions of the anode plate and cathode plate, the two plates and the MEA sandwiched therebetween can be well positioned in a cushioned manner and can be controlled under a predetermined compression pressure in advance before the silicon rubber is cured, thereby ensuring that a high quality single cell and module is obtained.

Yet a further object of this invention is to provide a single cell of a fuel cell or a module comprising the single cells with excellent gastight effect. By means of dispensing silicone rubber between plates, the leakage of the gases and liquid guided through the channels on the plates can therefore be avoided.

To achieve the above objects, in accordance with the present invention, there is provided a sealing structure for sealing a proton exchange membrane fuel cell. The fuel cell includes a membrane electrode assembly, an anode plate, and a cathode plate. Both of the plates are formed with a peripheral groove and an extended groove at a circumferential portion thereof, and silicone rubber is applied to the peripheral groove and the extended groove. Before the silicone rubber is cured, the anode plate, the membrane electrode assembly and the cathode plate are stacked and compressed with a predetermined compression pressure, such that the silicone rubber at the peripheral groove of the anode plate binds correspondingly to the silicone rubber at the peripheral groove of the cathode plate to form a tight sealing at the circumferential portions between the anode plate and the cathode plate, and the membrane electrode assembly is tightly sandwiched between the silicone rubber at the extended groove of the anode plate and the silicone rubber at the extended groove of the cathode plate to form a tight sealing around the ports between the anode plate and cathode plate.

The detailed technology and preferred embodiments implemented for the subject invention are described in the following paragraphs accompanying the appended drawings for people skilled in this field to well appreciate the features of the claimed invention.

DETAILED DESCRIPTION OF THE PREFERRED EMBODIMENTS

Figure 1:
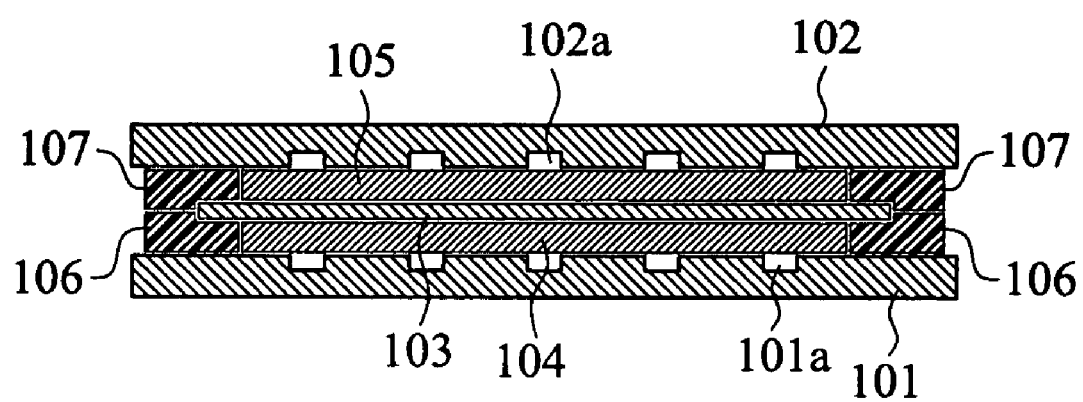
FIG. 1 is a schematic view showing a cross-section of the single cell of a prior art fuel cell.
Figure 2:
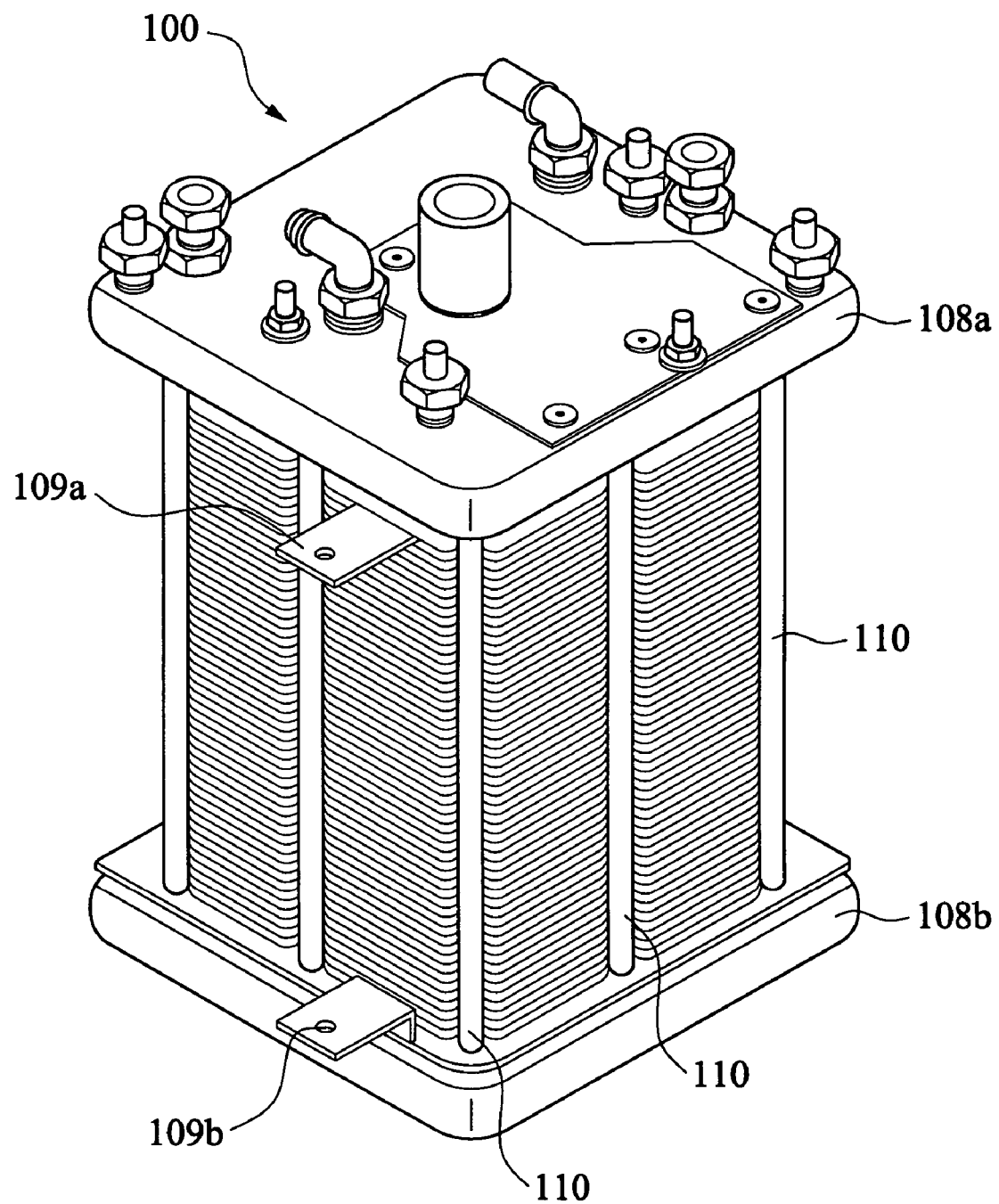
FIG. 2 is a perspective view of an assembled prior art fuel cell stack.
Figure 3:
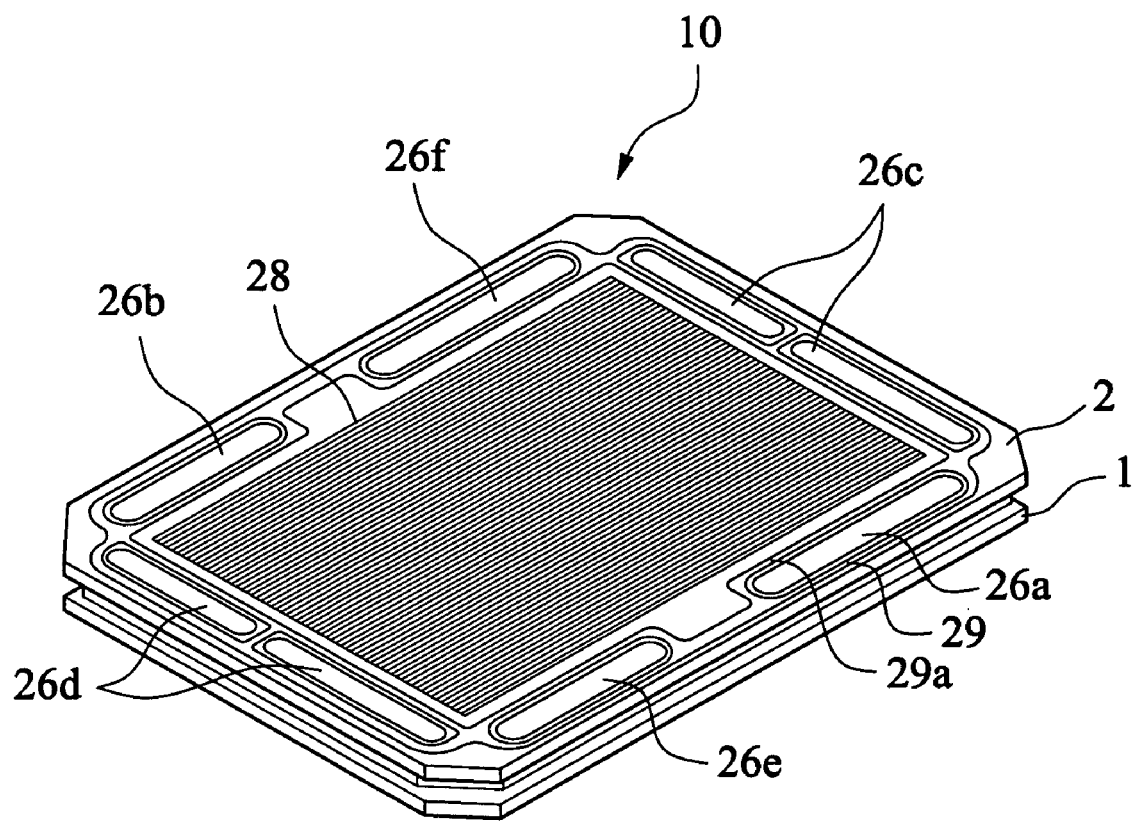
FIG. 3 is a schematic view showing a cross-section of a modulized single cell of a fuel cell according to the present invention.
Figure 4:
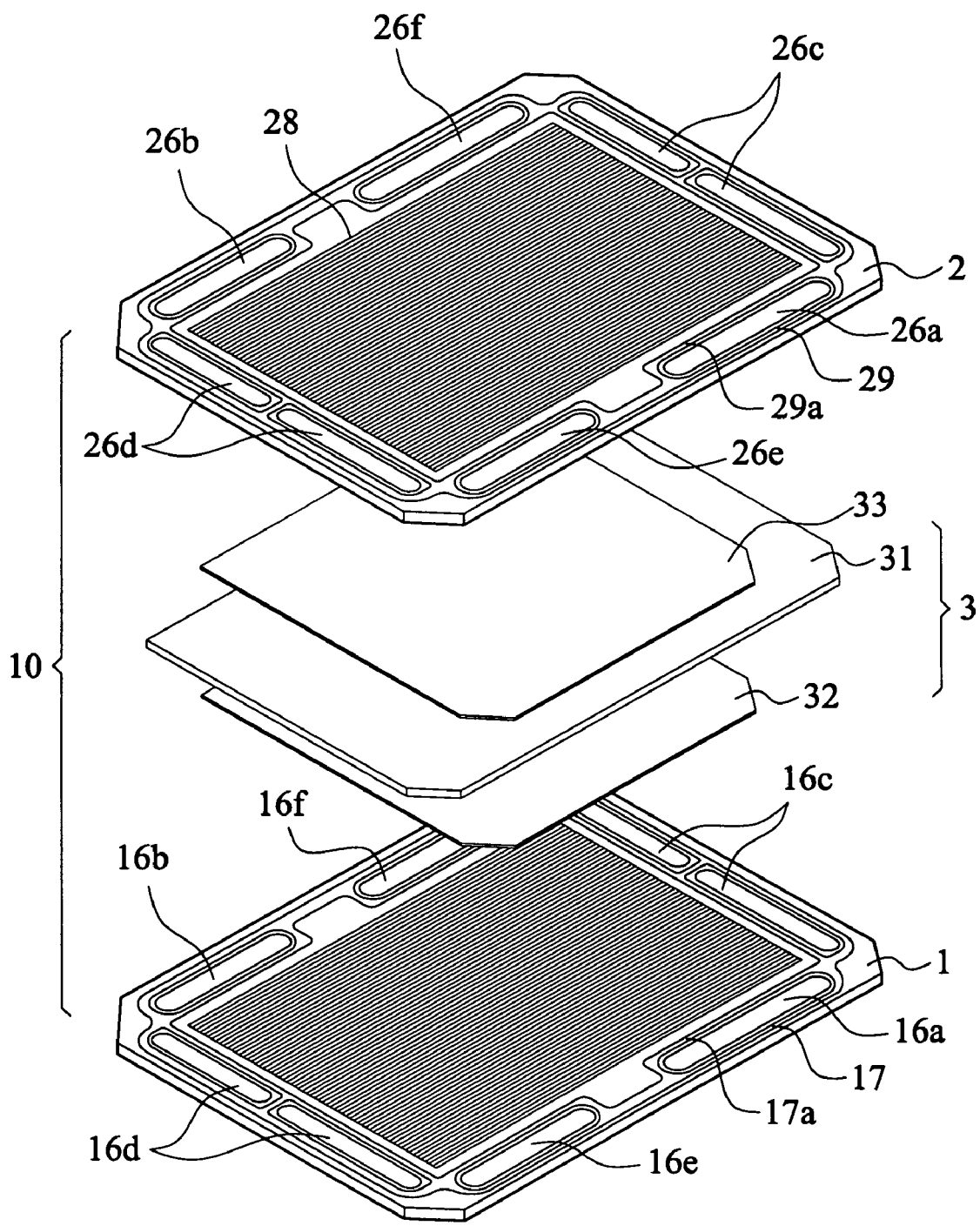
FIG. 4 is an exploded view showing the components of the single cell of FIG. 3.
Figure 5A:
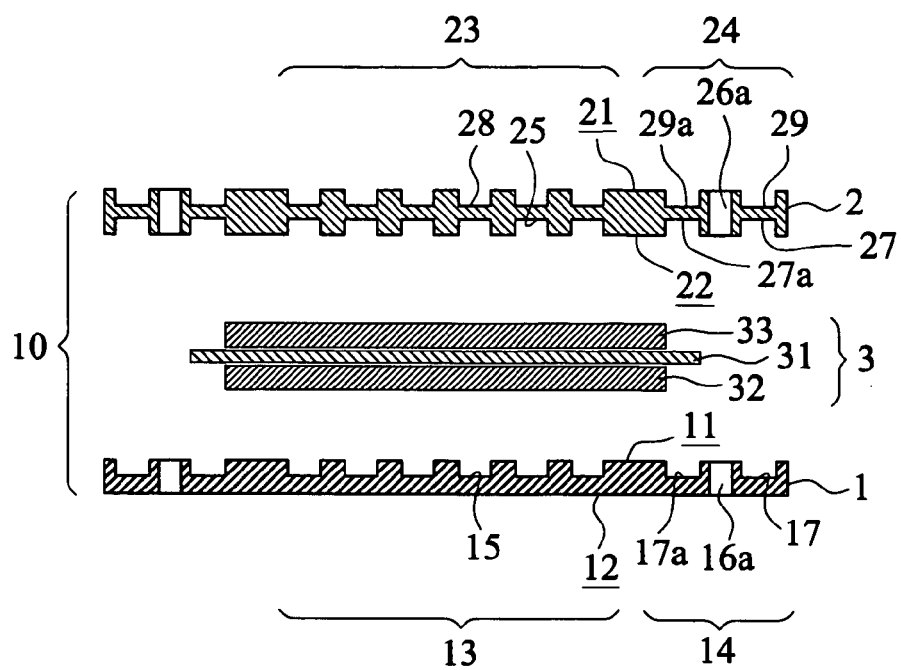
FIGS. 5A to 5D are cross-sectional views showing the assembly of the single cell according to a first embodiment of the present invention.

Please refer to the drawings and in particular to FIG. 3. FIG. 3 shows a modulized single cell 10 of a Proton Exchange Membrane Fuel Cell (PEMFC) according to the present invention. FIG. 4 is an exploded view showing the components of the modulized single cell 10 and FIG. 5A is a cross-sectional view of the components.

Of course, the technical concept is not restricted to a PEMFC. The modulization technology of the subject invention is applicable to any type of fuel cell having similar construction.

The modulized single cell 10 includes an anode plate 1 and a cathode plate 2, serving as separator plates for the fuel cell. The anode plate 1 has a first surface 11, a second surface 12, a central portion 13 and a circumferential portion 14. The central portion 13 on the first surface 11 is formed with a plurality of anode gas channels 15 having predetermined layout for hydrogen flowing therethrough. The circumferential portion 14 of the anode plate 1 is formed with a hydrogen inlet port 16a, a hydrogen outlet port 16b, an air inlet port 16c, an air outlet port 16d, a coolant inlet port 16e and a coolant outlet port 16f. In the embodiment, the second surface 12 of the anode plate 1 is generally flat in structure.

Similarly, the cathode plate 2 has a first surface 21, a second surface 22, a central portion 23 and a circumferential portion 24. The central portion 23 on the second surface 22 is formed with a plurality of cathode gas channels 25 having predetermined layout for air flowing therethrough. The circumferential portion 24 of the cathode plate 2 is formed with a hydrogen inlet port 26a, a hydrogen outlet port 26b, an air inlet port 26c, an air outlet port 26d, a coolant inlet port 26e, and a coolant outlet port 26f.

When the cathode plate 2 is superimposed on the anode plate 1, the hydrogen inlet port 26a, the hydrogen outlet port 26b, the air inlet port 26c, the air outlet port 26d, the coolant inlet port 26e, and the coolant outlet port 26f at the circumferential portion 24 of the cathode plate 2 are located oppositely and communicated respectively with the hydrogen inlet port 16a, the hydrogen outlet port 16b, the air inlet port 16c, the air outlet port 16d, the coolant inlet port 16e and the coolant outlet port 16f at the circumferential portion 14 of the anode plate 1, forming passages for flowing of hydrogen, air, and coolant respectively.

A membrane electrode assembly (MEA) 3 is mounted between the anode plate 1 and cathode plate 2. The MEA 3 has an anode gas diffusion layer (GDL) 32, a proton exchange membrane (PEM) 31 and a cathode gas diffusion layer (GDL) 33, that are sequentially stacked and located between the central portion 13 of the anode plate 1 and the central portion 23 of the cathode plate 2. An anode catalytic layer (not shown) is coated between the anode GDL 32 and the PEM 31, and a cathode catalytic layer (not shown) is coated between the PEM 31 and the cathode GDL 33, such that the hydrogen introduced through the channels 15 of the anode plate 1 and the oxygen introduced through the channels 25 of the cathode plate 2 are adapted to proceed with the reverse reaction of the electrolytic dissociation of water.

The first surface 11 of the circumferential portion 14 of the anode plate 1 is formed with a peripheral groove 17. Also, an extended groove 17a is formed in the vicinity of the ports 16a, 16b, 16c, 16d, 16e, 16f and communicated with the peripheral groove 17.

Similarly, the second surface 22 of the circumferential portion 24 of the cathode plate 2 facing the anode plate 1 is formed with a peripheral groove 27. An extended groove 27a is formed in the vicinity the ports 26a, 26b, 26c, 26d, 26e, 26f and communicated with the peripheral groove 27.

In this embodiment, the first surface 21 of the central portion 23 of the cathode plate 2 is also formed with a plurality of coolant channels 28 having predetermined layout for coolant flowing therethrough. The first surface 21 at the circumferential portion 24 of the cathode plate 2 is formed with a peripheral groove 29. An extended groove 29a is formed in the vicinity of the ports 26a, 26b, 26c, 26d, 26e, 26f and communicated with the peripheral groove 29.

Figure 5B:
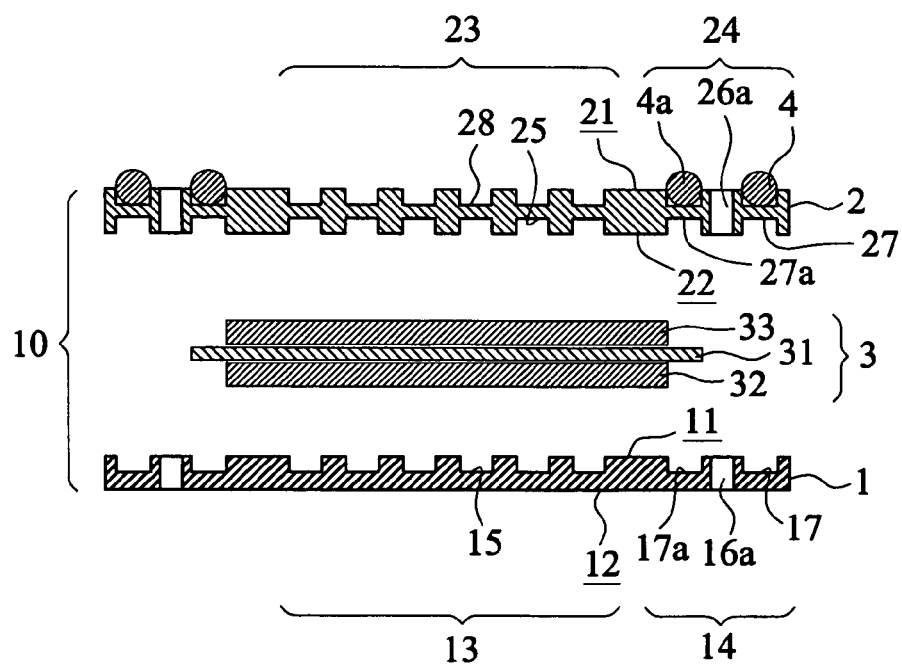

In the assembly of the single cell 10, appropriate amounts of silicone rubbers 4, 4a are applied to the peripheral groove 29 and the extended groove 29a at the first surface 21 of the cathode plate 2 and cured, as shown in FIG. 5B.

Figure 5C:
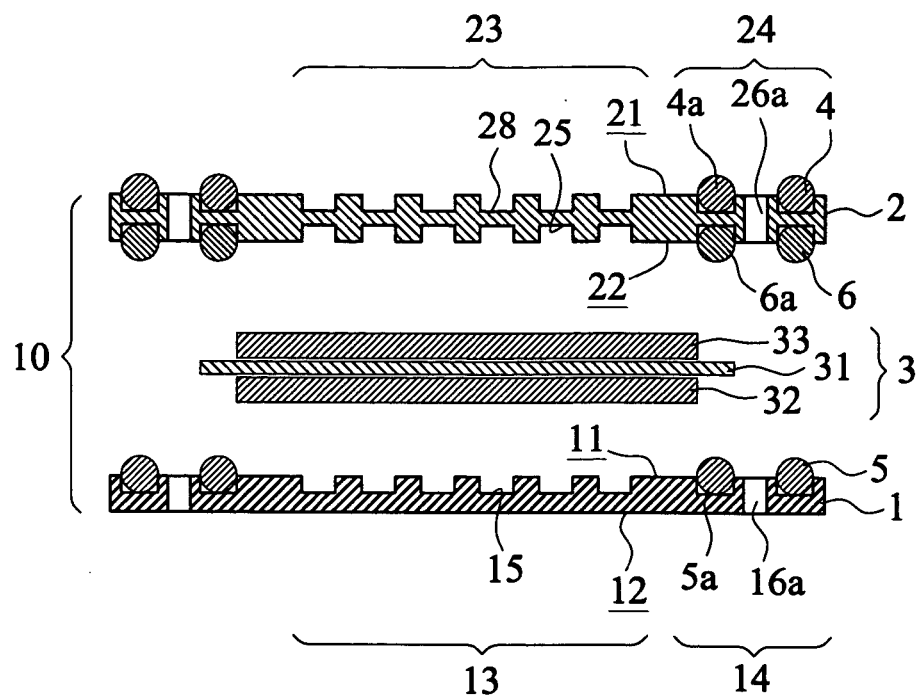
Figure 5D:
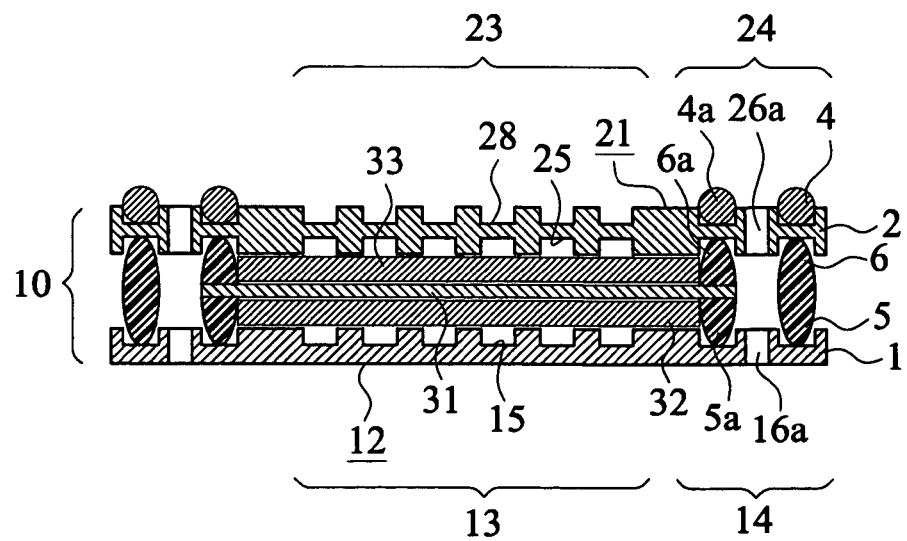

Then, appropriate amounts of silicone rubbers 5, 5a are applied to the peripheral groove 17 and the extended groove 17a at the first surface 11 of the circumferential portion 14 of the anode plate 1. As shown in FIG. 5C, appropriate amounts of silicone rubbers 6, 6a are also applied to the peripheral groove 27 and extended groove 27a at the second surface 22 of the circumferential portion 24 of the cathode plate 2. It is shown in FIG. 5D that after the application of the silicone rubbers 5, 5a, 6, 6a and before the silicone rubbers 5, 5a, 6, 6a are cured, the membrane electrode assembly 3 is sandwiched precisely between the central portion 13 of the anode plate 1 and the central portion 23 of the cathode plate 2 and the structure is compressed with a predetermined compression pressure. Accordingly, the silicone rubber 5 at the peripheral groove 17 of the anode plate 1 binds to the silicone rubber 6 at the peripheral groove 27 of the cathode plate 2, forming a tight sealing at the circumferential portion 14 between the anode plate 1 and cathode plate 2.

Moreover, the PEM 31 of the MEA 3 is adhered by the silicone rubber 5a at the extended groove 17a of the anode plate 1 and the silicone rubber 6a at the extended groove 27a of the cathode plate 2. Thereby, the PEM 31 is stably located in position between the anode plate 1 and the cathode plate 2, and tight sealing are formed around the ports between the anode plate 1 and cathode plate 2 after the silicone rubbers are cured. Thereby, each of the ports 16a, 16b, 16c, 16d, 16e, 16f at the anode plate 1 is only in communication respectively with the corresponding ports 26a, 26b, 26c, 26d, 26e, 26f at the cathode plate 2. Accordingly, a modulized unitary single cell 10 is formed.

By means of the described technology, the single cell 10 is tightly sealed at the circumferential portion. Moreover, the anode plate, MEA and cathode plate are stably positioned and fastened to each other. Sealing is provided between the ports of the anode plate and cathode plate, forming a plurality of separate passages. Thereby, hydrogen gas, oxygen gas and coolant are separately transported and sealed from leakage.

In the embodiment, silicone rubber is used as the adhesive material for binding the separator plates of the single cell 10. Preferably, the silicone rubber is selected from material which has non-corrosive electronic grade and can be cured under moisture or heat.

According to experimental and practical experiences, in the event that the silicone rubber made of heat-cured material is utilized for the manufacture of the single cell, the silicone rubber generally has a heat-cured temperature of 100-140° C. Because the curing temperature of the silicone rubber is higher than the working temperature (lower than 100° C.) of PEMFC, the silicone rubber is stable and can perform an optimal after-cured effect thereof. Preferably, to provide an optimal sealing and positioning effect, the viscosity of the silicone rubber utilized is greater than 150,000 centi-poise. Furthermore, the silicone rubber having a dielectric strength ranging from 15-20 V/mil would sufficiently perform a considerable electricity resistance. Nevertheless, the above-mentioned values are proposed for people skilled in this field to implement the present invention under a preferred situation. It dos not mean that any values going beyond the proposed ranges cannot perform well the expected functions as set forth therein.

In practical application, one can assemble a plurality of single cells as mentioned above and superimpose them onto one another to form a cell module for performing high power output.

Figure 6A:
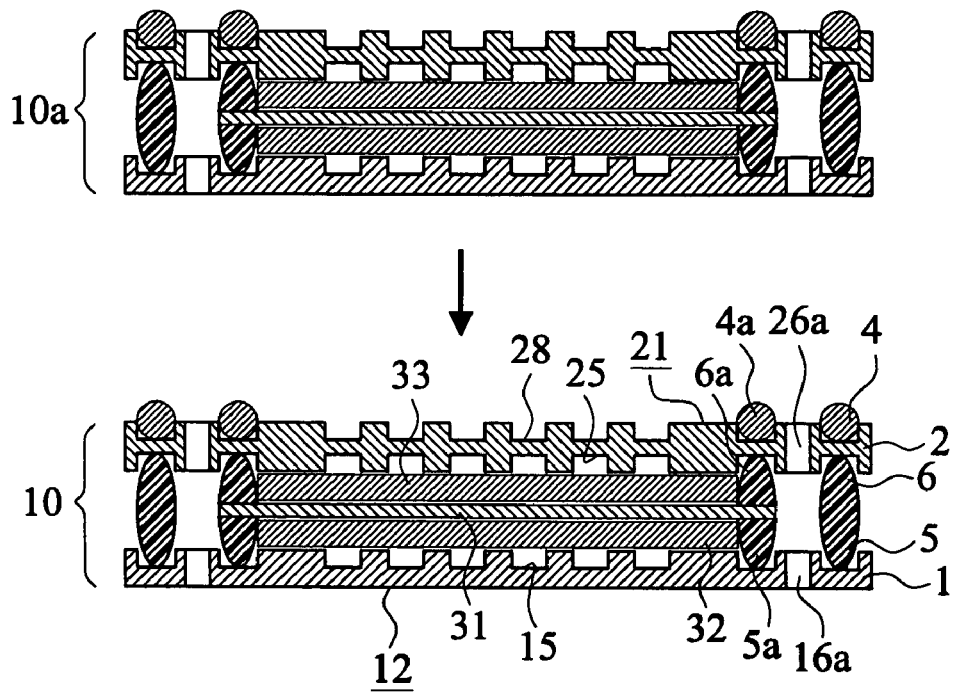
FIGS. 6A to 6B are cross-sectional views showing the stacking of two single cells of FIG. 5D to form a fuel cell module in accordance with a second embodiment of the present invention.
Figure 6B:
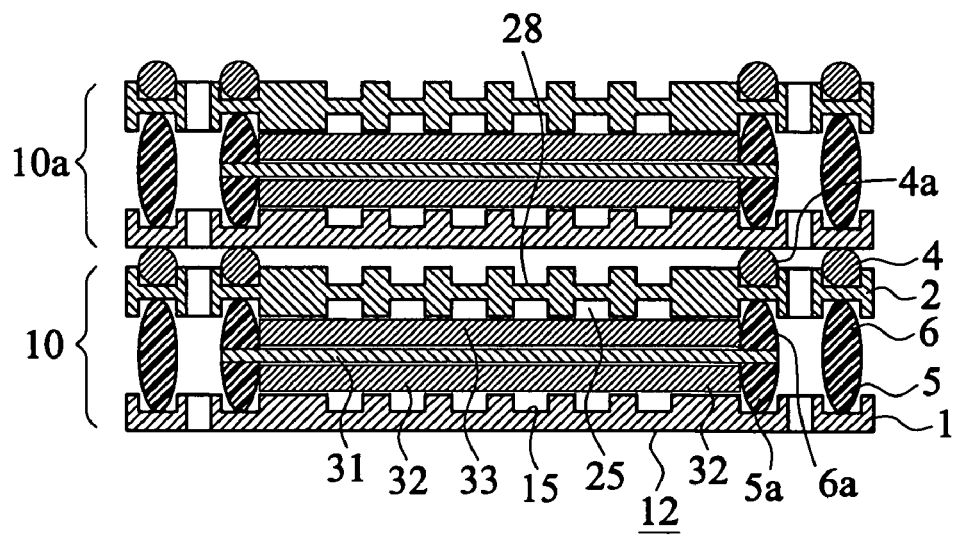

FIG. 6a shows a cross-sectional view of a second embodiment of the present invention, in which two single cells are superimposed to form a fuel cell module. Two modulized single cells 10, 10a are formed in accordance with the technology as mentioned. Please refer to FIG. 6B. The single cells 10, 10a are then stacked together, such that the anode plate 1 at the bottom of the second single cell 10a is superimposed on the top of the cathode plate 2 of the first single cell 10. Accordingly, the plane structure of the second surface of the anode plate of the second single cell 10a forms the top surface of the coolant channels on the first surface 21 of the cathode plate 2, providing a passage for coolant flowing therethrough. By means of the silicone rubbers 4, 4a which are previously applied at the first surface 21 of the cathode plate 2 of the first single cell 10 and by compressing the two modulized single cells 10, 10a with a predetermined compression pressure, the two single cells 10, 10a are stably bound together and the coolant channels 28 are tightly sealed.

Figure 7A:
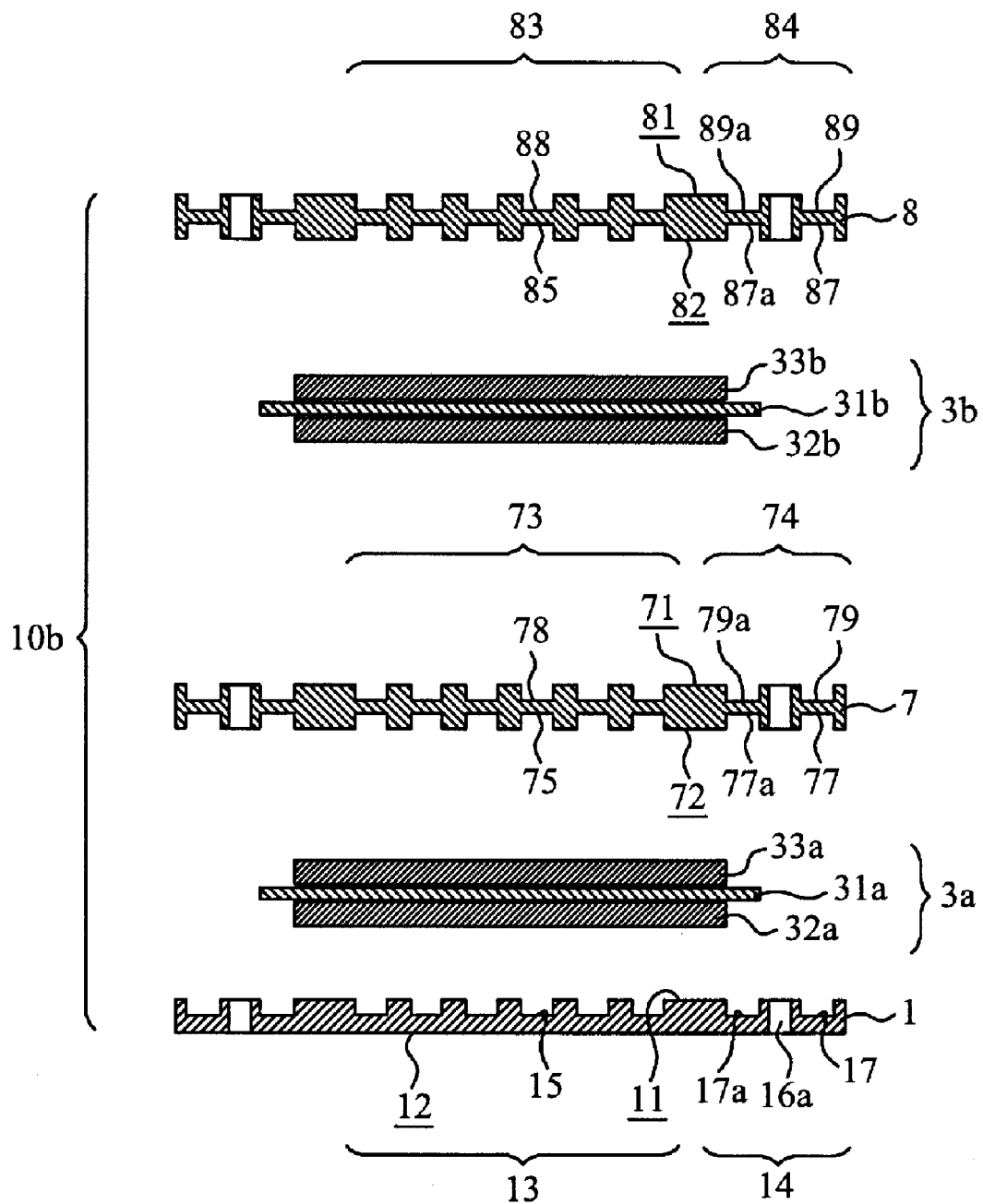
FIGS. 7A to 7D are cross-sectional views showing the assembly of the cell module according to a third embodiment of the present invention.

FIG. 7A is a cross-sectional view showing the cell module constructed in accordance with a third embodiment of the present invention. In the example shown, the cell module comprises two MEAs, one bipolar plate, an anode plate and a cathode plate. Similar reference numerals are used to identify elements that are similar or identical as that in FIGS. 5A to 5D.

In this embodiment, the cell module 10b comprises an anode plate 1, a bipolar plate 7 and a first MEA 3a. The anode plate 1 has a first surface 11, a second surface 12, a central portion 13, a circumferential portion 14, a plurality of anode gas channels 15, a peripheral groove 17, an extended groove 17a, and a plurality of ports. The bipolar plate 7 comprises a first surface 71, a second surface 72, a central portion 73, a peripheral portion 74, a plurality of cathode gas channels 75, a peripheral groove 77, an extended groove 77a, a peripheral groove 79, an extended groove 79a, and a plurality of ports. Furthermore, the first surface 71 of the central portion 73 is formed with a plurality of anode gas channels 78 for anode gas flowing therethrough. The first MEA 3a comprises a proton exchange membrane 31a, an anode gas diffusion layer 32a and a cathode gas diffusion layer 33a.

A second MEA 3b is stacked on the first surface 71 of the bipolar plate 7. The second MEA 3b comprises a proton exchange membrane 31b, an anode gas diffusion layer 32b and a cathode gas diffusion layer 33b, in which the anode gas diffusion layer 32b of the second MEA 3b is superimposed on the central portion 73 at the first surface 71 of the bipolar plate 7. A cathode plate 8 is then stacked on the top of the cathode gas diffusion layer 33b of the second MEA 3b.

The cathode plate 8 includes a first surface 81, a second surface 82, a central portion 83, a circumferential portion 84, a plurality of cathode gas channels 85, a peripheral groove 87 and an extended groove 87a formed at the second surface 82, a peripheral groove 89 and an extended groove 89a formed at the first surface 81 and a plurality of ports. Also, a plurality of coolant channels 88 are formed at the first surface 81 of the central portion 83 of the cathode plate 8 for coolant flowing therethrough.

Figure 7B:
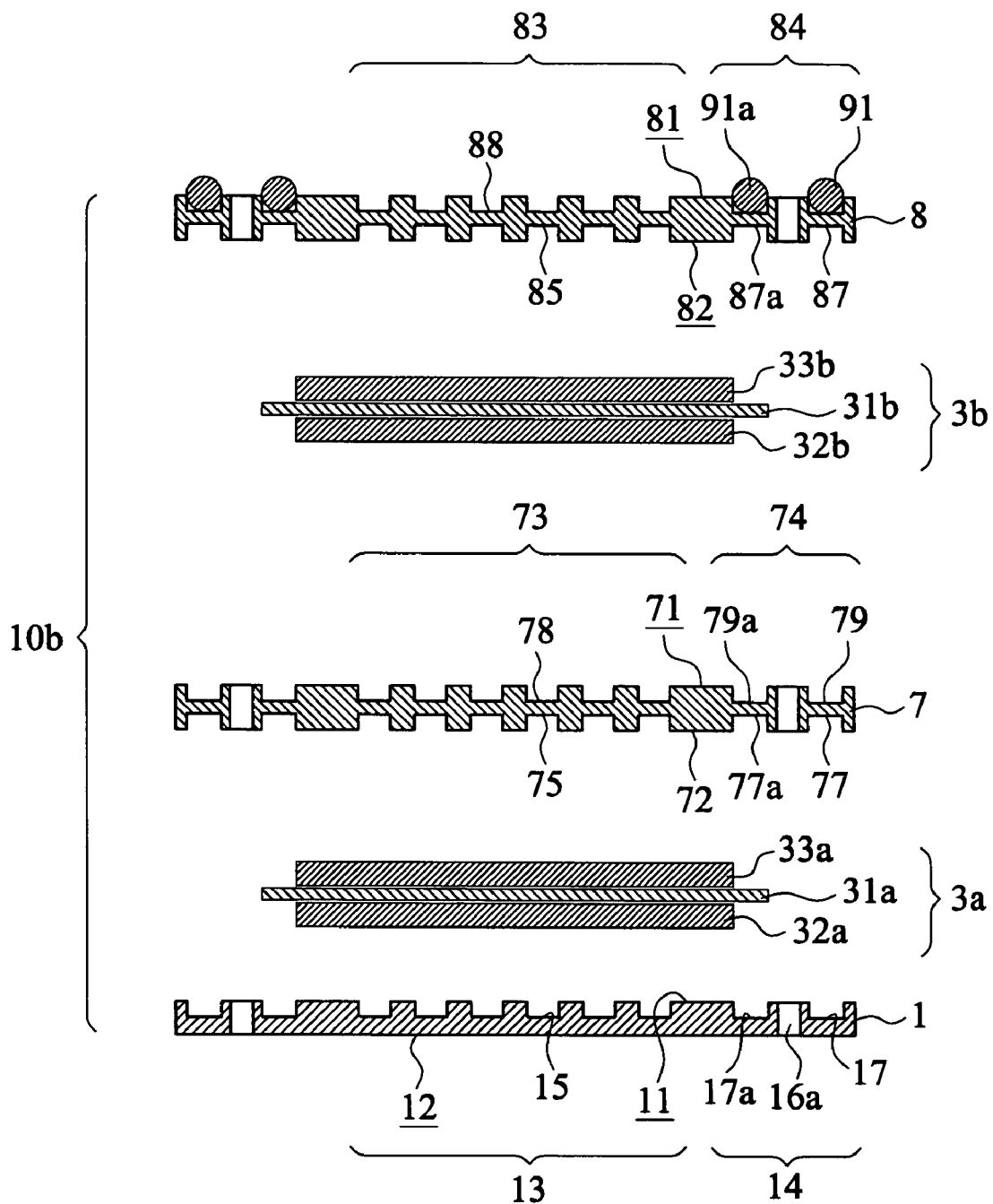
Figure 7C:
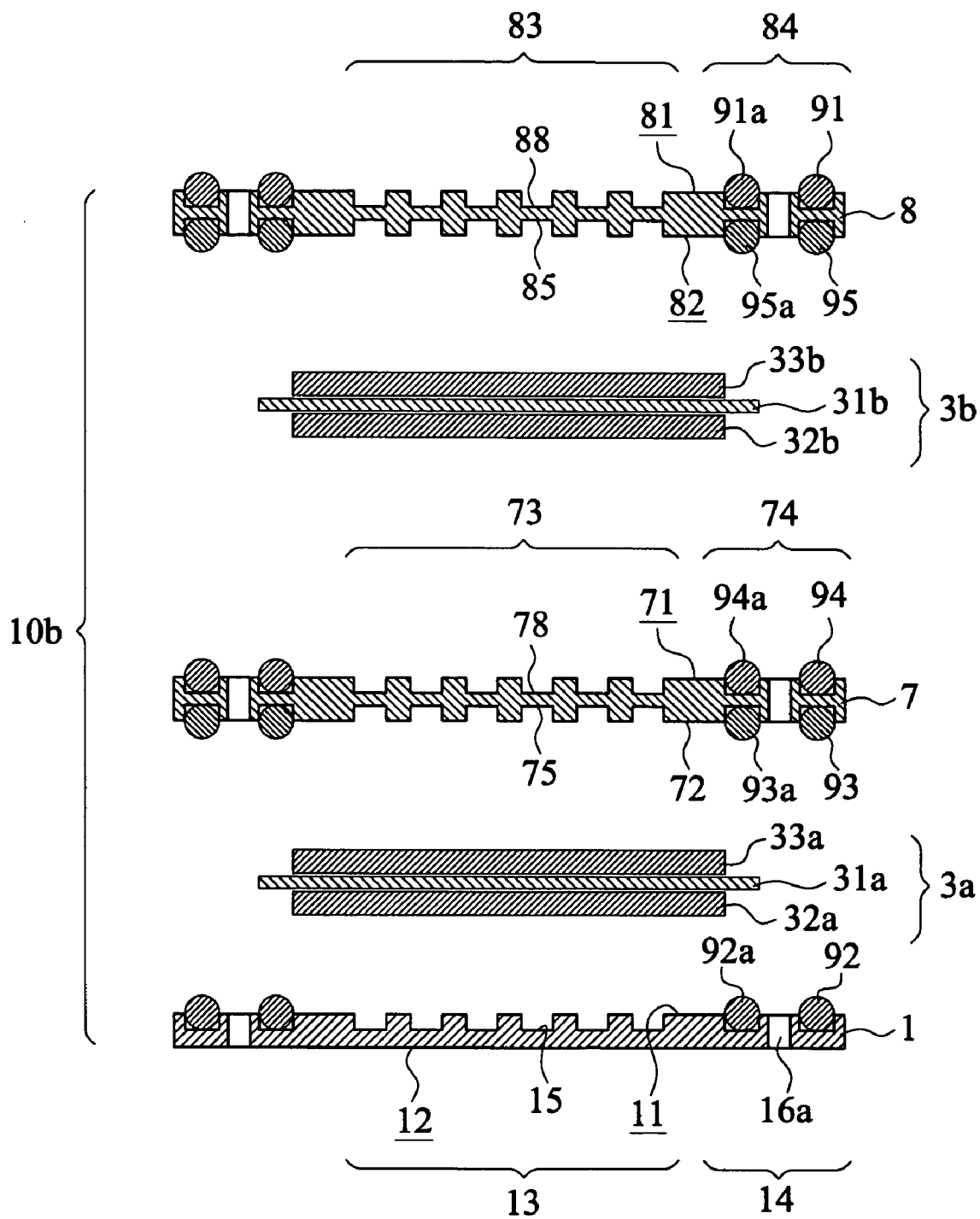

In the manufacture of the cell module 10b, the peripheral groove 89 and extended groove 89a at the first surface 81 of the circumferential portion 84 are dispensed with silicone rubbers 91, 91a, as shown in FIG. 7B. The silicone rubbers 91, 91a are cured.

Figure 7D:
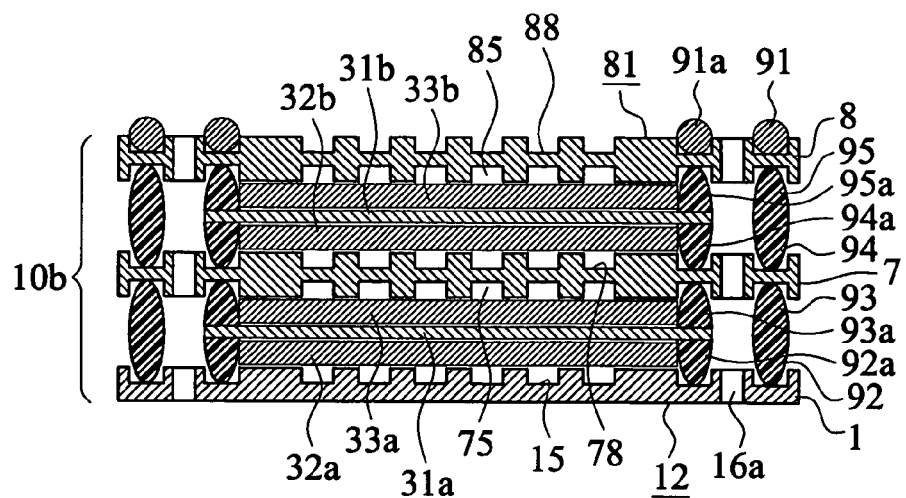

Then, the peripheral groove 17 and extended groove 17a of the anode plate 1 are applied with silicone rubbers 92, 92a. Similarly, the peripheral grooves 77, 79 and extended grooves 77a, 79a of the bipolar plate 7 and the peripheral groove 87 and extended groove 87a of the cathode plate 8 are respectively applied with silicone rubbers 93, 94, 93a, 94a, 95, 95a. Before the silicone rubbers are cured, the anode plate 1, first MEA 3a, bipolar plate 7, second MEA 3b, and cathode plate 8 are precisely stacked in proper order and compressed with a predetermined compression pressure, as shown in FIG. 7D. The silicone rubbers 92, 93, 94, 95 on each plate stick to the corresponding silicone rubbers at the opposing surface and is cured to form a tight sealing. The sealing tightly seal the circumferential portions among the anode plate 1, bipolar plate 7 and cathode plate 8. Besides, the silicone rubbers 92a, 93a correspondingly stick to the proton exchange membrane 31a of the first MEA 3a and the silicone rubbers 94a, 95a correspondingly stick to the proton exchange membrane 31b of the second MEA 3b, such that the first and second MEA 3a, 3b are stably anchored in position and sealings are formed around the ports between adjacent plates. Hence, an integrated modularized cell module 10b is formed.

Figure 8A:
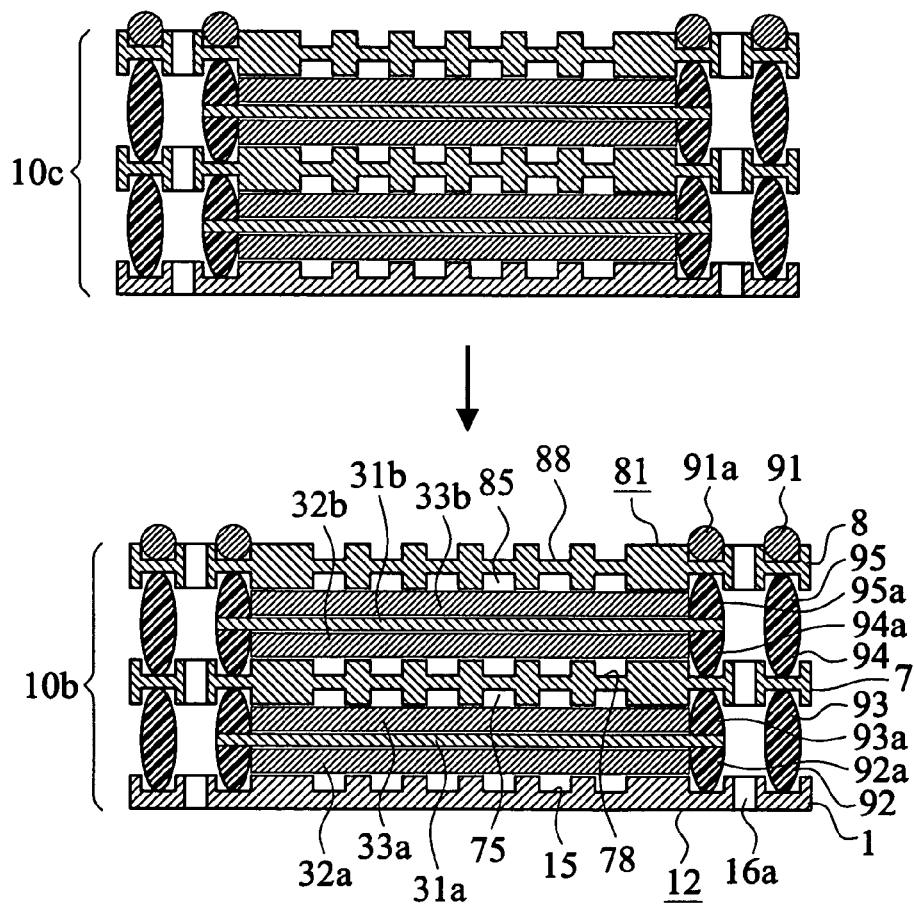
FIGS. 8A to 8B are cross-sectional views showing the stacking of two cell modules of FIG. 7D to form a fuel cell stack in accordance with a fourth embodiment of the present invention.
Figure 8B:
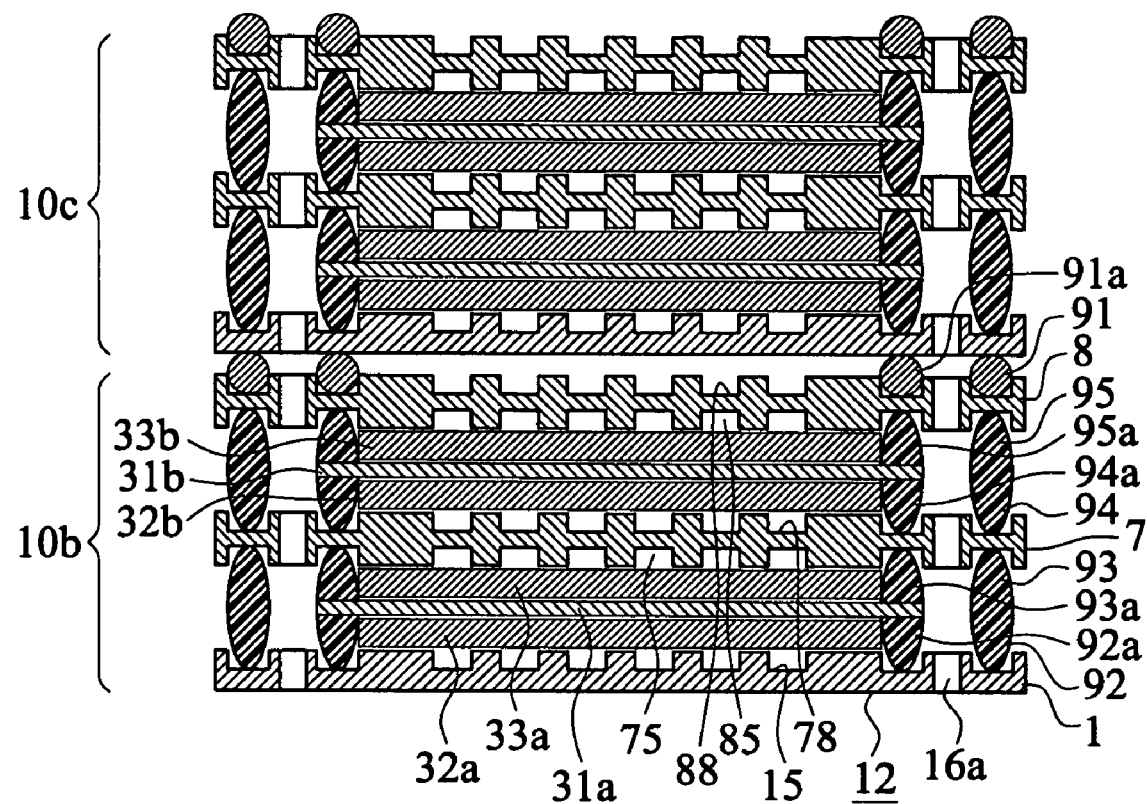

FIGS. 8A to 8B are cross-sectional views showing the stacking of two cell modules of FIG. 7D to form a fuel cell stack in accordance with a fourth embodiment of the present invention. In assembly, two cell modules 10b, 10c manufactured by the technology are stacked together in series, such that the second surface of the anode plate of the cell module 10c is superimposed on the first surface of the cathode plate of cell module 10b, as shown in FIG. 8b. Accordingly, the flat structure of the second surface of the anode plate of cell module 10c forms the top surface of the coolant channels on the first surface of the cathode plate 8. By means of the silicone rubbers 91, 91a applied at the first surface of the cathode plate 8 of the cell module 10b, and by compressing the two cell modules 10b, 10c with a predetermined compression pressure, the two cell modules are bound together, forming a tight structure. Hence, the coolant channels are tightly sealed for flowing of coolant therethrough.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A sealing structure for sealing a single fuel cell, comprising:
   a membrane electrode assembly, including an anode side with an anode gas diffusion layer, a cathode side with a cathode gas diffusion layer, and a proton exchange membrane mounted between the anode gas diffusion layer and the cathode gas diffusion layer;
   an anode plate mounted to the anode gas diffusion layer of the membrane electrode assembly, which comprises a first surface facing to the anode gas diffusion layer of the membrane electrode assembly, a second surface, a central portion, a circumferential portion and a plurality of ports formed at the circumferential portion, in which the first surface is formed with a plurality of anode gas channels at the central portion, a peripheral groove at the circumferential portion and an extended groove around the ports in communication with the peripheral groove; and
   a cathode plate mounted to the cathode gas diffusion layer of the membrane electrode assembly, which comprises a first surface, a second surface facing to the cathode gas diffusion layer of the membrane electrode assembly, a central portion, a circumferential portion and a plurality of ports formed at the circumferential portion, in which the second surface is formed with a plurality of cathode gas channels at the central portion, a peripheral groove at the circumferential portion and an extended groove around the ports in communication with the peripheral groove;
   wherein in assembly of the single fuel cell, a silicone rubber is respectively applied to the peripheral groove and the extended groove at the first surface of the anode plate and the peripheral groove and the extended groove at the second surface of the cathode plate, and before the silicone rubbers have cured, the anode plate, the membrane electrode assembly and the cathode plate are stacked and compressed with a predetermined compression pressure, such that the silicone rubber at the peripheral groove of the anode plate binds correspondingly to the silicone rubber at the peripheral groove of the cathode plate to form a tight seal at the circumferential portions between the anode plate and the cathode plate, and the proton exchange membrane of the membrane electrode assembly has an entire periphery thereof tightly sandwiched between and surrounded by the silicone rubber at the extended groove of the anode plate and the silicone rubber at the extended groove of the cathode plate to form a tight seal around the ports between the anode plate and cathode plate.

2. The single fuel cell as claimed in claim 1, wherein the first surface of the cathode plate is further formed with a plurality of coolant channels thereon.

3. The single fuel cell as claimed in claim 1, wherein the second surface of the anode plate has a flat structure.

4. A sealing structure for sealing a fuel cell module including a plurality of stacked single fuel cells, each of the single fuel cells comprising:
   a membrane electrode assembly, including an anode side with an anode gas diffusion layer, a cathode side with a cathode gas diffusion layer, and a proton exchange membrane mounted between the anode gas diffusion layer and the cathode gas diffusion layer;
   an anode plate mounted to the anode gas diffusion layer of the membrane electrode assembly, which comprises a first surface facing to the anode gas diffusion layer of the membrane electrode assembly, a second surface, a central portion, a circumferential portion and a plurality of ports formed at the circumferential portion, in which the first surface is formed with a plurality of anode gas channels at the central portion, a peripheral groove at the circumferential portion and an extended groove around the ports in communication with the peripheral groove; and
   a cathode plate mounted to the cathode gas diffusion layer of the membrane electrode assembly, which comprises a first surface, a second surface facing to the cathode gas diffusion layer of the membrane electrode assembly, a central portion, a circumferential portion and a plurality of ports formed at the circumferential portion, in which the second surface is formed with a plurality of cathode gas channels at the central portion, a peripheral groove at the circumferential portion and an extended groove around the ports in communication with the peripheral groove;

wherein in assembly of the single fuel cell, a silicone rubber is respectively applied to the peripheral groove and the extended groove at the first surface of the anode plate and the peripheral groove and the extended groove at the second surface of the cathode plate, and before the silicone rubbers have cured, the anode plate, the membrane electrode assembly and the cathode plate are stacked and compressed with a predetermined compression pressure, such that the silicone rubber at the peripheral groove of the anode plate binds correspondingly to the silicone rubber at the peripheral groove of the cathode plate to form a tight seal at the circumferential portions between the anode plate and the cathode plate, and the proton exchange membrane of the membrane electrode assembly has an entire periphery thereof tightly sandwiched between and surrounded by the silicone rubber at the extended groove of the anode plate and the silicone rubber at the extended groove of the cathode plate to form a tight seal around the ports between the anode plate and cathode plate.

5. The fuel cell module as claimed in claim 4, wherein the first surface of the cathode plate of the single fuel cell is formed with a plurality of coolant channels at the central portion, a peripheral groove and an extended groove in communication with the peripheral groove at the circumferential portion, and silicone rubbers are applied to the peripheral groove and extended groove and cured.

6. The fuel cell module as claimed in claim 4, wherein the second surface of the anode plate of the single fuel cell has a flat structure.

7. A sealing structure for sealing a fuel cell module, comprising:

a first membrane electrode assembly and a second membrane electrode assembly, each membrane electrode assembly including an anode side with an anode gas diffusion layer, a cathode side with a cathode gas diffusion layer, and a proton exchange membrane mounted between the anode gas diffusion layer and the cathode gas diffusion layer;

at least one bipolar plate, sandwiched between the membrane electrode assemblies, the bipolar plate including a first surface, a second surface, a central portion, a circumferential portion and a plurality of ports formed at the circumferential portion, in which the first surface of the central portion is formed with a plurality of cathode gas channels and the second surface of the central portion is formed with a plurality of anode gas channels; and the circumferential portions of the first surface and second surface are formed with a peripheral groove and an extended groove around the ports in communication with the peripheral groove;

an anode plate mounted to the anode gas diffusion layer of the second membrane electrode assembly, which comprises a first surface facing to the anode gas diffusion layer of the membrane electrode assembly, a second surface, a central portion, a circumferential portion and a plurality of ports formed at the circumferential portion, in which the first surface is formed with a plurality of anode gas channels at the central portion, a peripheral groove at the circumferential portion and an extended groove around the ports in communication with the peripheral groove; and a cathode plate mounted to the cathode gas diffusion layer of the first membrane electrode assembly, which comprises a first surface, a second surface facing to the cathode gas diffusion layer of the membrane electrode assembly, a central portion, a circumferential portion and a plurality of ports formed at the circumferential portion, in which the second surface is formed with a plurality of cathode gas channels at the central portion, a peripheral groove at the circumferential portion and an extended groove around the ports in communication with the peripheral groove;

wherein in assembly of the fuel cell module, a silicone rubber is respectively applied to the peripheral grooves and the extended grooves at the first surfaces of the anode plate and the bipolar plate and the second surfaces of the cathode plate and the bipolar plate, and before the silicone rubbers have cured, the anode plate, the membrane electrode assemblies, the bipolar plate, and the cathode plate being stacked and compressed with a predetermined compression pressure, such that the silicone rubber at the peripheral groove on the first side of the anode plate binds correspondingly to the silicone rubber at the peripheral groove on the second side of the bipolar plate to form a tight seal at the circumferential portions between the anode plate and the bipolar plate, and the proton exchange membrane of the second membrane electrode assembly has an entire periphery thereof tightly sandwiched between and surrounded by the silicone rubber at the extended groove of the anode plate and the silicone rubber at the extended groove of the bipolar plate to form a tight seal around the ports between the anode plate and the bipolar plate; and the silicone rubber at the peripheral groove on the second side of the cathode plate binds correspondingly to the silicone rubber at the peripheral groove on the first side of the bipolar plate to form a tight seal at the circumferential portions between the cathode plate and the bipolar plate, and the proton exchange membrane of the first membrane electrode assembly has an entire periphery thereof tightly sandwiched between and surrounded by the silicone rubber at the extended groove of the cathode plate and the silicone rubber at the extended groove of the bipolar plate to form a tight seal around the ports between the cathode plate and the bipolar plate.

8. The fuel cell module as claimed in claim 7, wherein the first surface of the cathode plate further comprises a plurality of coolant channels thereon.

9. The fuel cell module as claimed in claim 7, wherein the second surface of the anode plate has a flat structure.

* * * * *